US005388412A

United States Patent [19]

Schulte-Werning et al.

[11] Patent Number: 5,388,412

[45] Date of Patent: Feb. 14, 1995

[54] GAS TURBINE COMBUSTION CHAMBER WITH IMPINGEMENT COOLING TUBES

[75] Inventors: Burkhard Schulte-Werning, Basel; Roger Suter, Zürich, both of Switzerland

[73] Assignee: Asea Brown Boveri Ltd., Baden, Switzerland

[21] Appl. No.: 151,797

[22] Filed: Nov. 15, 1993

[30] Foreign Application Priority Data

Nov. 27, 1992 [DE] Germany .............................. 4239856

[51] Int. Cl.[6] .............................. F02C 7/18; F23R 3/02

[52] U.S. Cl. .............................. 60/760; 60/752; 60/754

[58] Field of Search .................. 60/752, 754, 759, 760, 60/755; 165/908; 431/243, 353

[56] References Cited

U.S. PATENT DOCUMENTS

| | | | |
|---|---|---|---|
| 4,339,925 | 7/1982 | Eggmann et al. | 60/760 |
| 4,901,522 | 2/1990 | Commaret et al. . | |
| 4,916,906 | 4/1990 | Vogt | 60/752 |

FOREIGN PATENT DOCUMENTS

| | | | |
|---|---|---|---|
| 0203431 | 12/1986 | European Pat. Off. . | |
| 0239020 | 5/1990 | European Pat. Off. . | |
| 1938326 | 2/1970 | Germany . | |
| 2339366 | 2/1974 | Germany . | |
| 2836539 | 2/1980 | Germany . | |
| 3842470 | 6/1989 | Germany . | |
| 3908166 | 10/1989 | Germany . | |
| 616318 | 2/1961 | Italy | 165/908 |
| 849255 | 9/1960 | United Kingdom | 60/752 |
| 1356114 | 6/1974 | United Kingdom | 165/908 |

*Primary Examiner*—Timothy S. Thorpe
*Attorney, Agent, or Firm*—Burns, Doane, Swecker & Mathis

[57] ABSTRACT

In a gas turbine combustion chamber (1) cooled by means of impingement cooling, the height of the cooling duct (5) formed by the perforated plate (3) and the impingement surface (4) increases continuously in the transverse flow direction to correspond with the supply of cooling air. Tubes (7) are arranged in the cooling duct (5) on the holes (6) of the perforated plate (3) in such a way that the impingement air meets the impingement surface (4) at right angles, the height of the tubes (7) increasing in the transverse flow direction in such a way that the distance between the tubes (7) and the impingement surface (4) is constant over the complete length of the cooling duct (5). By this means, the heat transfer coefficient remains constant along the impingement cooling section and uniform removal of heat is made possible. The cooling effect can be specifically controlled by a suitable choice of the diameter of the holes (6) and the height of the tubes (7).

4 Claims, 1 Drawing Sheet

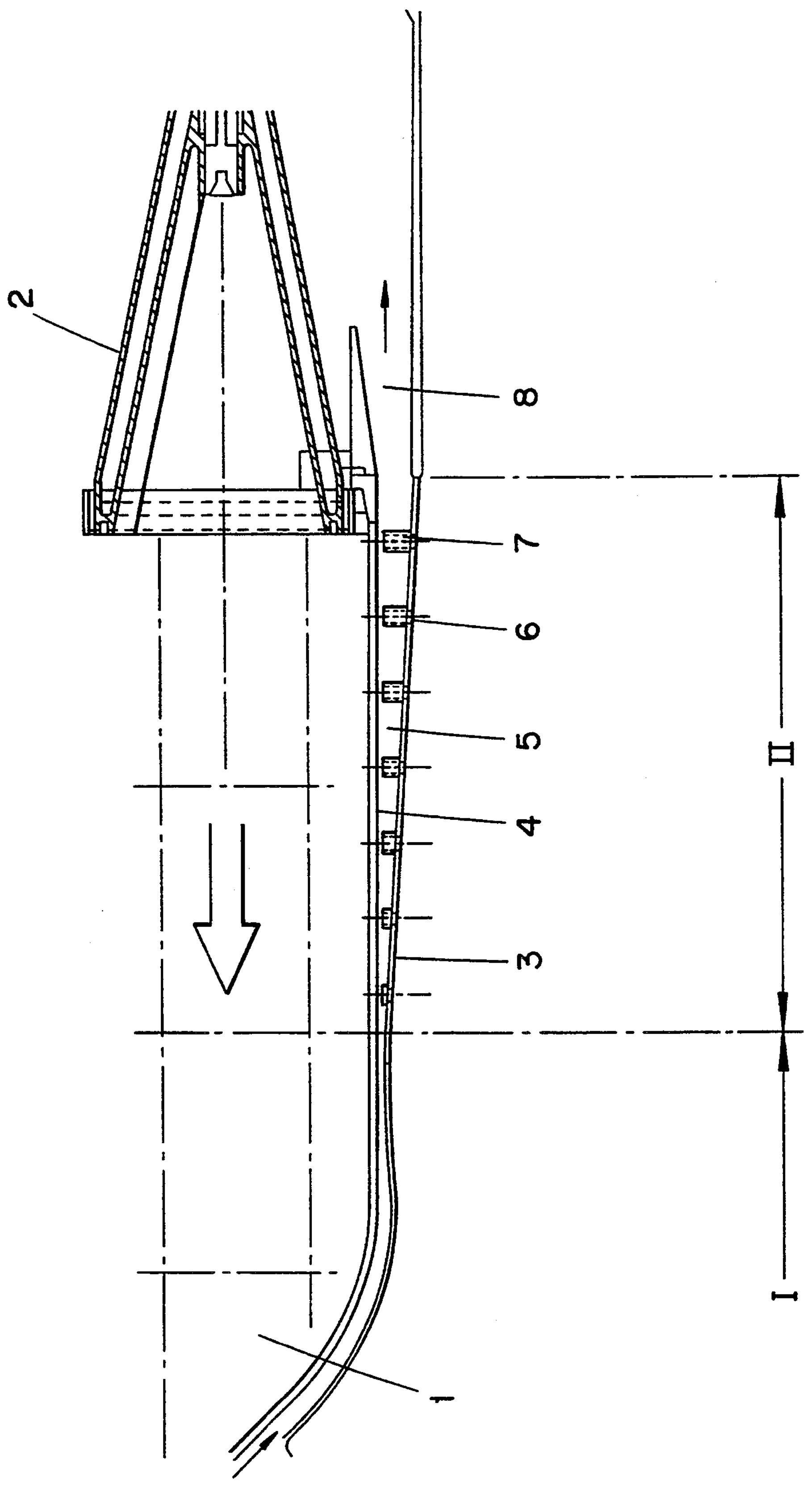
2
8
7
6
5
4
3
II
I
1

GAS TURBINE COMBUSTION CHAMBER WITH IMPINGEMENT COOLING TUBES

BACKGROUND OF THE INVENTION

1. Field of the Invention

The invention relates to a gas turbine combustion chamber in which the combustion chamber wall is cooled by means of impingement cooling.

2. Discussion of Background

Such gas turbine combustion chambers are known. In order to effect the impingement cooling concept, for example to cool an annular combustion chamber wall, a perforated plate is used which generates a cooling gas jet in such a way that it meets the surface located under it at right angles and cools the surface. The perforated plate and the impingement surface together form a duct in which the entering cooling air mass is transported further.

The heat transfer coefficient of the first cooling jet is the largest. It then decreases along the length of the impingement cooling duct because the influence of the increasing transverse flow velocity leads to increasing deflection of the impingement jet.

After a fairly long distance, therefore, the cooling effect of this impingement cooling is only slightly better than that of pure convection cooling.

In order, nevertheless, to achieve a cooling effect which is to some extent uniform over a certain distance, the impingement cooling flows have previously been respectively restarted so that an approximately saw-toothed shape around a required average value is achieved for the heat transfer coefficient.

The disadvantages of the prior art consist in the fact that no uniform cooling effect is achieved over the complete length of the cooling section and that additional complication has to be accepted for the restarting of the impingement cooling flows.

The known technical solution from the Deutsche Offenlegungsschrift 28 36 539, in which cooling air guides in the form of tubes of a constant length are inserted into the openings of the perforated plate in order to improve the impingement cooling effect in a hot gas casing for gas turbines, cannot obviate these disadvantages either.

SUMMARY OF THE INVENTION

Accordingly, one object of the invention is to avoid all these disadvantages and to shape the cooling duct between the outer and inner shell so as to cool the combustion chamber wall, by means of impingement cooling, in a gas turbine combustion chamber, in such a way that the transverse flow velocity in the cooling duct is constant and a uniform cooling effect is achieved. An additional object is to achieve specified control of the cooling effect.

In accordance with the invention, this is achieved in a gas turbine combustion chamber in which the combustion chamber wall can be cooled by means of impingement cooling, with the cooling gas jet impinging through a perforated plate on the impingement surface, tubes being arranged in the cooling duct on the holes of the perforated plate and the perforated plate and the impingement surface forming the cooling duct, by the fact that the height of the cooling duct increases continuously in the transverse flow direction to correspond with the supply of cooling air and, by this means, the undesirable transverse flow is kept small. In addition, the tubes are arranged in the cooling duct in such a way that the impingement air meets the impingement surface at right angles, the height of the tubes increasing in the transverse flow direction in such a way that the distance between the tubes and the impingement surface is constant over the complete length of the cooling duct.

The advantages of the invention may be seen, inter alia, in the fact that there is a constant transverse flow velocity in the cooling duct, that the viscous pressure loss in the cooling duct is reduced and that the impingement jet velocity is constant. The heat transfer coefficient is kept constant along the impingement cooling section so that a very uniform removal of heat is made possible.

It is expedient for the height of the cooling duct and the height of the tubes to increase linearly.

It is, furthermore, advantageous for the diameter of the holes, the distance apart of the holes and the height of the tubes to be selected as a function of the desired cooling effect. The cooling can therefore be intensified locally, at the end of the counterflow cooling of an annular combustion chamber, for example, in order to remove the high heat flows near the burner.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein an embodiment example of the invention is shown. The single figure shows a partial longitudinal section through an annular combustion chamber with environment-friendly burners (double-cone burners).

DESCRIPTION OF THE PREFERRED EMBODIMENTS

Referring now to the drawing, wherein only the elements essential for understanding the invention are shown and the flow direction of the working media is indicated by arrows, part of a gas turbine combustion chamber 1 is shown in the figure. It is an annular combustion chamber with environment-friendly burners 2 (double-cone burners). The inner wall of the gas turbine combustion chamber 1 is cooled by convective cooling with subsequent impingement cooling, i.e. the impingement cooling section II follows on from the convective cooling section I. In order to reduce the total pressure loss, the transition to the burner inlet flow is configured as a small diffuser 8.

The cooling duct 5 between the perforated plate 3 and the impingement surface 4 has a height which increases linearly in the transverse flow direction. This divergent cooling duct 5 has the effect that there is a constant transverse flow velocity, i.e. an increase in cross-section area compensates for the mass supplied via the perforated plate 3. This measure leads to a reduction in the viscous pressure loss in the cooling duct 5 and to a constant impingement jet velocity because of the fact that the pressure difference across the perforated plate 3 is now constant.

However, this also increases the cooling jet distance before meeting the impingement surface 4 so that a small transverse flow acting along this distance can also deflect the cooling jet and, therefore, reduce the cooling effect. Compensation is achieved by attaching the tubes 7 to the perforated plate 3 and on the holes 6 in such a way that the distance to the impingement surface 4 in the cooling duct 5 is constant and the impingement air is brought near the cooling surface (impingement surface 4) in the passages of the tubes 7 and then meets the impingement surface 4 at right angles.

The combination of the two measures keeps the heat transfer coefficient along the impingement cooling section II constant and therefore achieves a very uniform removal of heat.

The cooling effect can be influenced in a specific manner by suitable choice of the height of the tubes 7 and the diameter, and distance apart, of the holes 6 so that, for example, the cooling can be intensified locally towards the end of the counterflow cooling of the combustion chamber 1 with environment-friendly burners 2 in order to remove the high heat flows near the burners 2.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United Stated is:

1. A gas turbine combustion chamber in which a combustion chamber wall is cooled by impingement cooling, comprising:

a plate, perforated with a plurality of holes, mounted spaced apart from an outer surface of the combustion chamber to form a cooling gas duct along the outer surface of the combustion chamber to conduct a cooling gas flow along the outer surface, the holes guiding additional cooling gas into the cooling duct as jets impinging through the perforated plate on the outer surface of the combustion chamber;

a plurality of tubes arranged in the cooling duct on the holes of the perforated plate to direct the cooling gas jets onto the outer surface;

wherein a height of the cooling duct increases continuously in a transverse combustion chamber flow direction to correspond with an increasing mass of cooling gas in the cooling duct to maintain a constant gas speed, and wherein the tubes are positioned to direct the impingement gas on the impingement surface at right angles, a height of the tubes increasing in the transverse flow direction so that a distance between the tubes and the impingement surface is constant over the complete length of the cooling duct.

2. The gas turbine combustion chamber as claimed in claim 1, wherein the height of the cooling duct and the height of the tubes increases linearly.

3. The gas turbine combustion chamber as claimed in claim 1, wherein a diameter of the holes, a distance between the holes and a height of the tubes are selected to provide a predetermined cooling air flow volume to the outer surface of the combustion chamber.

4. A gas turbine combustion chamber having impingement cooling of an outer surface of the combustion chamber, comprising:

a plate mounted in spaced relation from the outer surface to define a cooling duct along the length of the outer surface to guide a cooling air flow in a direction opposite to a flow direction of the combustion chamber, the plate having a plurality of holes to allow an additional air flow into the cooling duct, the plate positioned so that a distance between the plate and the outer surface increases continuously in the flow direction of the cooling duct so that a cooling air velocity remains constant as a mass of cooling air in the cooling duct increases; and, a plurality of cooling air tubes, each tube mounted on the plate at a hole in the plate and positioned in the cooling duct to direct cooling air to impinge perpendicularly on the outer surface, a length of the tubes being selected so that outlet ends of the tubes are a singular predetermined distance from the outer surface.

* * * * *